United States Patent [19]
Allt et al.

[11] Patent Number: 5,347,647
[45] Date of Patent: Sep. 13, 1994

[54] METHOD OF PREDICTING THE PERFORMANCE OF AN EMULATED COMPUTER SYSTEM

[75] Inventors: George Allt, Oldham; John R. Eaton, Salford, both of United Kingdom

[73] Assignee: International Computers Limited, Putney, United Kingdom

[21] Appl. No.: 737,263

[22] Filed: Jul. 29, 1991

[30] Foreign Application Priority Data

Oct. 31, 1990 [GB] United Kingdom ............... 9023633

[51] Int. Cl.$^5$ .................. G06F 11/34; G06F 1/00; G06G 7/48
[52] U.S. Cl. ................. 395/575; 371/16.2; 364/264.3; 364/551.01; 364/578; 395/500
[58] Field of Search ............ 395/575, 500, 550; 364/264.3, 578, 551.01; 371/19, 16.2

[56] References Cited

U.S. PATENT DOCUMENTS

| | | | |
|---|---|---|---|
| 4,872,121 | 10/1989 | Chan et al. ................ | 364/551.01 |
| 4,899,306 | 2/1990 | Greer et al. ................ | 364/900 |
| 4,918,594 | 4/1990 | Onizuka ..................... | 364/200 |
| 5,045,994 | 9/1991 | Belfer et al. ............... | 364/200 |
| 5,088,033 | 2/1992 | Binkley et al. ............. | 395/500 |
| 5,109,350 | 4/1992 | Henwood et al. ........... | 364/550 |
| 5,153,886 | 10/1992 | Tuttle et al. ............... | 371/67.1 |
| 5,202,975 | 4/1993 | Rasbold et al. ............ | 395/575 |
| 5,204,956 | 4/1993 | Danuser et al. ............ | 395/575 |

Primary Examiner—Robert W. Beausoliel, Jr.
Assistant Examiner—Norman M. Wright
Attorney, Agent, or Firm—Lee, Mann, Smith, McWilliams, Sweeney & Ohlson

[57] ABSTRACT

A method and apparatus as described for predicting the performance of a computer system. A benchmark program is run on an existing host computer, and is monitored to determine the actual sequence of instructions in the instruction set of the host. These are then converted into the corresponding sequence in the instruction set of the target. The performance of the target system in executing these instructions is then determined.

2 Claims, 1 Drawing Sheet

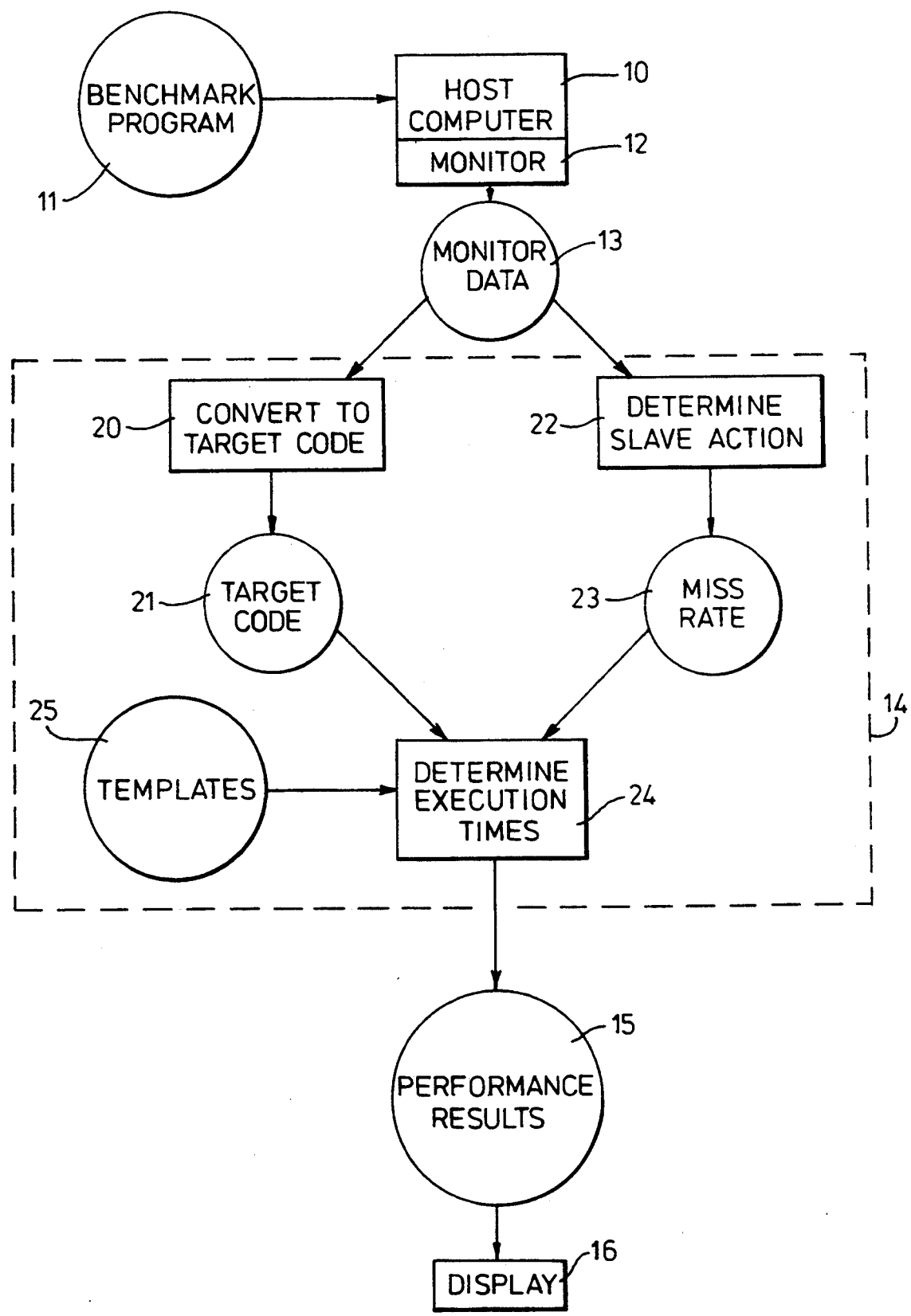

METHOD OF PREDICTING THE PERFORMANCE OF AN EMULATED COMPUTER SYSTEM

BACKGROUND OF THE INVENTION

This invention relates to a method and apparatus for predicting the performance of a computer system.

One known way of predicting the performance of a computer system is to construct a software model, which allows the behaviour and performance of the system to be studied and analysed without having to construct the actual hardware of the system.

Typically, the simulation model is used to simulate the operation of the target system when running a test program in the instruction set of the target system. The model decodes the current instruction in the test program, determines the effect of the instruction on the target system (e.g. what registers are updated and what store accesses are made) and determines the next instruction of the test program to be executed. This can be a very slow and complex process, and requires a detailed model of the target system, which clearly cannot be done until the design of the target computer has reached this level of detail.

The object of the present invention is to provide a novel method of predicting the performance of a computer system, in which this problem is alleviated.

SUMMARY OF THE INVENTION

According to the invention there is provided a method of predicting the performance of a target computer system, the method comprising:
 (a) monitoring the running of a program on a host computer to determine the sequence of instruction execution,
 (b) converting the sequence of instructions executed on the host computer into a corresponding sequence of instructions for the target computer, and
 (c) determining the performance of the target computer in response to the instructions.

It can be seen that the invention provides a novel approach to the problem of performance prediction, which avoids the need for simulating the detailed behaviour of the target system.

BRIEF DESCRIPTION OF THE DRAWING

The drawing is a schematic block design of apparatus for performing a prediction method in accordance with the invention.

DESCRIPTION OF AN EMBODIMENT OF THE INVENTION

One performance prediction method and apparatus in accordance with the invention will now be described by way of example with reference to the accompanying drawing.

It is assumed in this example that the target computer (i.e. the computer whose performance is to be predicted) is a pipelined computer comprising a plurality of pipeline stages such as: instruction fetch, decode, operand address generation, operand fetch, and execute. It is also assumed that the target computer includes a slave or cache store for holding instructions and operands.

Referring to the drawings, a host computer 10 is arranged to run a benchmark or test program 11, compiled in the instruction set of the host computer. For example, the host may be an ICL series 39 level 80 mainframe computer, the benchmark program being compiled into the ICL 2900 instruction set.

The operation of the host is monitored by monitoring means 12, to generate a monitor data file 13, which is then dumped on to magnetic tape. The monitoring means 12 may be a separate hardware unit, but preferably it consists of microcode routines which run on the host computer.

The monitored information includes, for each instruction executed in the host:
 (a) the identity of the instruction
 (b) the register usage of the instruction
 (c) the store activity associated with the instruction.
 (d) instance-specific information, such as operand values.

The monitor data file 13 is then processed by a performance model 14, to generate a performance results file 15, which can be displayed on a display unit 16. The performance model 14 may be a separate hardware unit, but in this embodiment consists of software running on a computer, which may conveniently be the host computer 10.

The performance model comprises a number of software routines 20, 22, 24.

Routine 20 inspects the data in the monitor data file 13, and generates a corresponding sequence of target code instructions 21 in the instruction set of the target computer system.

It is assumed in this example that the instruction set of the target computer system is related to, but not identical with, that of the host computer. For example, the instruction set of the target may be a reduced set of the host instruction set. Thus, the operation of the module 20 involves translating each instruction executed by the host computer into a corresponding instruction, or sequence of instructions, in the instruction set of the target.

Routine 22 reads the data in the monitor file 13, and determines the slave store usage for each instruction. From this, the routine 22 produces miss rate statistics 23 for the slave.

Routine 24 takes each of the target code instructions in turn, and assigns to that instruction one of a set of templates 25, which indicate the hardware usage of that instruction in successive stages of the pipeline. In particular, each template indicates the register reads and writes to be performed by the instruction at each pipeline stage.

The routine 24 then uses these templates, in conjunction with the miss rate statistics 23, to determine the earliest possible execution time for each instruction. For example, the instruction templates of two successive instructions may indicate that the first instruction updates a register at a certain pipeline stage, and a second instruction reads the same register at an earlier pipeline stage. In that case, a pipeline hold-up may be necessary to delay the execution of the second instruction so as to ensure that the operand is updated by the first instruction before it is read by the second instruction. Also, if a slave miss occurs, the execution of an instruction must be delayed.

The output of the routine 24 is the set of performance data 15 indicating, for example, the expected time to execute the benchmark program.

In a modified form of the arrangement described above, instead of simply extracting statistical data about the slave miss rate, the actual outcome of the slave access (hit or miss) may be determined for each instruction, and this information used by the routine 24.

It may also be required to perform a range definition test, to check whether the target computer meets the range definition standards of an existing range of computers.

If a simulation model of the target computer is available, the range definition test may be performed on the simulation model. However, such a range definition test normally requires a very large test program, comprising a sequence of test instructions along with a large number of checking instructions to check that the test instructions have been correctly executed. Such a large test program would take a very long time to execute on a simulation model.

This problem can be overcome as follows:

First, a test program, consisting of a sequence of test instructions, is run on a host computer which is known to meet the range definition standards. The states of the host computer after each instruction of this test program are monitored (e.g. by the monitoring means 12 described above) and the results are dumped on magnetic tape.

The same test program is now run on the simulation model. The state of the simulated target computer is compared, at the end of each instruction, with the monitored state of the host computer at the end of the corresponding instruction. Any discrepancy indicates that the target computer does not conform to the range definition standards.

The test program used with this method can be much shorter than that required for conventional range definition tests, since it consists solely of test instructions, and does not require any checking instructions. It has been found that this can reduce the size of the test program by a factor of 10000, with a corresponding reduction in the length of time required to run the test program on the simulation model.

We claim:

1. A method of predicting the performance of a target computer having a target instruction set, using a host computer having a host instruction set different from said target instruction set, the method comprising:
    (a) running a program on the host computer,
    (b) capturing data from the host computer while the host is running said program, said data including identities of instructions executed by said host computer, register usage of each of said instructions, and store activity associated with each of said instructions,
    (c) evaluating captured data to identify an actual sequence of instructions in said host instruction set, and to identify a sequence of store accesses made by said actual sequence of instructions,
    (d) translating said actual sequence of instructions into a corresponding sequence of instructions in said target instruction set,
    (e) determining the operation of a slave store forming part of the target computer system under said sequence of store accesses, to predict miss rate information relating to the slave store and,
    (f) determining an earliest possible time for execution of each of said corresponding sequence of instructions on said target computer, using said miss rate information and taking into account dependencies between successive instructions, thereby producing an estimate of how long the target computer would require to execute said corresponding sequence of instructions.

2. A method according to claim 1 wherein the step of determining said earliest possible time for execution of each of said corresponding sequence of instructions on said target computer comprises assigning one of a set of templates to each instruction, each template indicating the hardware usage associated with the instruction in the target computer.

* * * * *